June 3, 1958    P. SOULARY    2,837,627
AUTOMATIC MULTIPLE ARC WELDING METHODS
Filed March 7, 1956
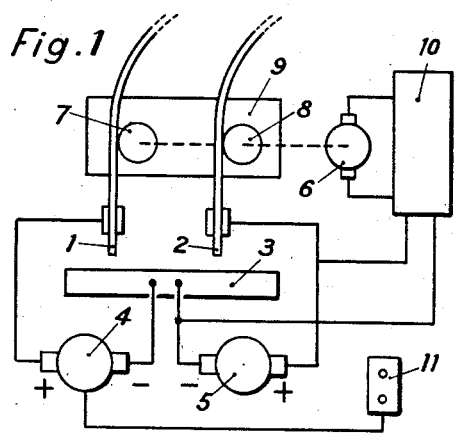
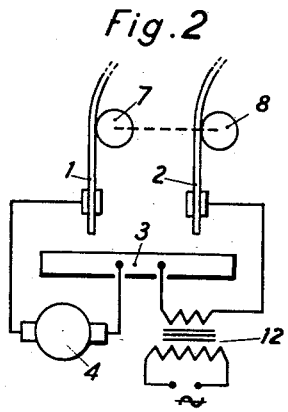
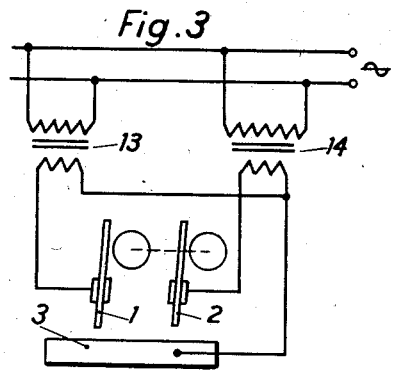
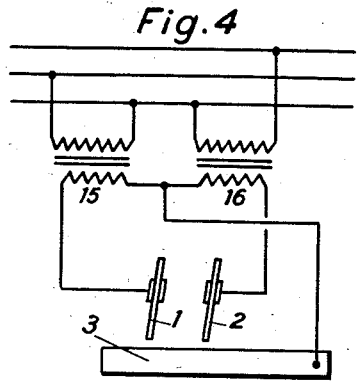
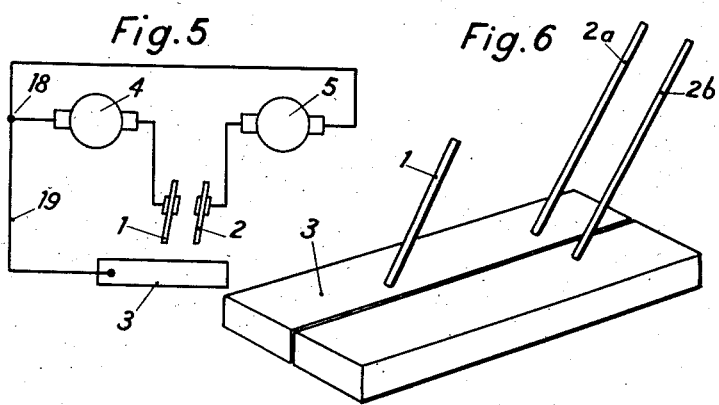
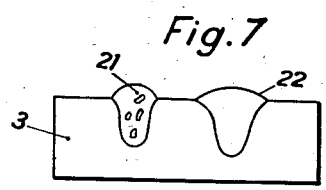
INVENTOR
PIERRE SOULARY
BY Stone, Boyden & Mack.
ATTORNEYS

United States Patent Office 2,837,627
Patented June 3, 1958

2,837,627

AUTOMATIC MULTIPLE ARC WELDING METHODS

Pierre Soulary, Croissy-sur-Seine, France, assignor to Unionmelt, Societe Anonyme Francaise, Paris, France Application March 7, 1956, Serial No. 570,129

Claims priority, application France March 18, 1955

3 Claims. (Cl. 219—137)

The present invention relates to automatic welding and hardfacing of ferrous metals by means of multiple arcs, in particular according to the submerged arc process, in which a plurality of associated electrodes, of the fusible type, are fed through a layer of flux covering the joint to be welded. It concerns, more particularly, an improvement in the automatic multiple arc welding process, intended, especially for taking a fuller advantage of the possibilities, not sufficiently utilized heretofore, offered by the simultaneous use of several electrodes, both as regards the rapidity of the welding operation and the saving of materials: electrode wire and flux, consumed in this operation.

Various methods are already known which make it possible to weld with two electrodes energized in parallel from the same source of current. When an increase in speed is desired, these electrodes are arranged in tandem, i. e. behind one another along the joint to be welded.

With a parallel connection, it is not possible, even by increasing considerably the current density, to space the electrodes as far apart as could sometimes be desired, for instance for allowing high welding speeds. The spacing is in general limited, to a maximum of approximately 1 centimeter, otherwise the re-ignition of the arcs is very irregular and difficult. In particular when one electrode is on a relatively cold portion of the weldpiece while the other one is on a hot portion, the re-ignition of the first one is very poor.

It is possible, obviously, to avoid this difficulty by energizing each electrode from a separate current source. This solution is sometimes applied in automatic welding, but it requires a rather complicated apparatus, since an automatic regulation of the feed rate of each electrode wire must be provided as a function of its own arc length. A method is known, however, according to which, the electrode, connected to different phases of a polyphased source, are driven by the same motor, the speed of which is regulated according to the arc voltage of one of the electrodes only. In order to make the melting speeds of the electrodes uniform, this method uses, in particular, reactances connected individually in parallel or in series with each welding arc, so as to cause, when the arc voltage of one electrode increases too much, an increase in the current supplied to the other electrodes. In case these reactances are connected in series, each of them comprises a saturating winding energized by a variable direct voltage obtained by comparing the arc voltages together.

Unlike previous methods, mentioned above, the improvement according to the present invention has the object, in automatic welding with submerged multiple arcs, to allow the use of electrodes or electrode groups energized from entirely separate current sources without being restricted to the system in which each electrode is connected to a separate phase of one polyphase source. Its purpose is, particularly, to make it possible to carry out this welding with several current sources which may be very different from one another in characteristics, thereby allowing a great latitude for the use of the equipment available in existing installations.

A further object of the invention is to allow the use, in submerged multiple arc welding, of a single ordinary automatic welding head, to which it is sufficient to add one or several additional sets of rollers, without making it necessary or even useful to provide, as in former methods recalled above, auxiliary means for varying, during a welding operation, the ratios between the speeds of rotation of said rollers or the values of the currents delivered to the various electrodes.

The improvement according to the present invention concerns the automatic welding of ferrous metals by means of multiple arcs, wherein, the electrodes, forming a common molten pool have, by the use of a single driving mechanism, instantaneous speeds which are, beforehand, in a constant ratio, in particular equal, these speeds being adjusted together automatically according to the voltage or current fluctuations of the arc of a single electrode (or a single electrode group power supplied in parallel). This electrode or electrode group will be called, hereinafter the "pilot electrode."

The improvement according to the present invention is characterized in particular in that the pilot electrode is power supplied from an independent current source, and the other electrodes (or electrode groups) which will be called "controlled electrodes" by one or more current sources, independent of one another, arranged and adjusted beforehand, in a known manner, so that the voltages and currents which are applied thereto correspond, taking into account the diameters of the wires, to speeds of fusion which are equal or proportional to the feed rate of the pilot electrode.

The applicant was led to the invention by observing that the normal operation of a welding head with a single electrode in a submerged arc, controlled by one of the conventional devices as a function of the arc voltage or arc current offers a constancy of speed of the same order as, if not higher than that which is necessary for carrying out automatic welding correctly in accordance with the so-called "constant speed method." This method has been described by the applicant in the French Patent No. 937,026 filed August 11, 1941, and it has been used frequently since, for automatic or semi-automatic welding with a fusible electrode under a granular flux or a gaseous flux. It is based on the fact that the welding characteristics: voltage and current, may be stable when the two following conditions are fulfilled: (a) feeding of the electrode wire at a constant and pre-adjusted speed, independent of the stress variations in the feeding motion and in the power supply conditions of the driving motor—(b) electric current supply to the welding circuit ensuring that any variation in the arc length gives rise to a variation in the opposite direction of the welding current and consequently of the fusion speed of the wire. A self regulation is thus derived from the arc length-current characteristic of the current generator, which is all the more effective, within the practical limits of operation, as the ratio arc length variation to current variation is smaller in absolute value, while remaining negative.

According to the invention, advantage is taken of the constancy of speed obtained in the normal operation of an automatic welding head controlled by the arc voltage or arc current of a fusible electrode (or a group of electrodes in parallel) which becomes a pilot electrode and which is energized from a conventional current source, for driving other electrodes at the same speed or at speeds which remain in the same ratio. In other words, the driving rollers for the electrode wires are secured on a single shaft or on separate shafts but are linked kinetically. The controlled electrodes are supplied by one or more conventional welding current generators, physically distinct from the source of welding current applied to the pilot electrode.

It will be noted, also, that the practice of multiple arc welding according to the invention requires an equipment which, as regards the feeding of the electrode wires, is very similar to that utilized in single electrode automatic welding, since it comprises a single driving mechanism and a single control device. It is further often easy to transform a single electrode welding head into a multiple arc welding head with separately energized arcs by adding a few gears and driving rollers.

It becomes thus possible, by using the invention to obtain the benefit of the advantages of automatic welding with separately energized multiple arcs, by using an apparatus, as easily displaceable and as simply controlled as those in current use for single electrode welding.

It should be noted that the adjustment of the melting speeds of the various electrodes is obtained, according to the invention, without any use of the special means recalled at the beginning, and considered necessary heretofore, for equalizing the currents supplied to these electrodes. These means were contemplated, anyhow, only for polyphase mountings, while the improvement according to the invention makes it possible to gang electrodes energized from entirely independent current sources, and even, for example, by associating A. C. and D. C. sources.

The choice of welding current parameters, of the number, spacing arrangement, material and diameters of the electrodes is obviously dictated by the nature of the works to be carried out.

The pilot electrode and the controlled electrodes may have different diameters or they may be constituted by different numbers of wire connected to the power supply sources, the sole essential condition for good operation being that the adjustment of these current sources correspond to melting speeds for the electrodes in the ratio of the driving speeds given by the machine.

It is possible also to associate wires with different chemical compositions, with a view to obtaining welding beads or deposits having special characteristics.

As stated above, the current sources may be identical or different. The examples given hereinafter mention the use of two D. C. sources or one D. C. source and one A. C. source, the pilot electrode being supplied with D. C. These examples are not limitative from that standpoint for the applications mentioned.

One could just as well energize the pilot electrode with alternating current, the controlled electrode being energized either with D. C. or with A. C.

If two A. C. sources are used, they may be connected on the same phase of the three phase mains, or on two different phases, in a V arrangement. It is also possible to use a three-phase, two-phase set up, such as the Scott system. On the other hand, it does not seem advisable to connect, as in the former technique recalled above, the pilot electrode, the controlled electrode and the workpiece, with the three poles of a three-phase system comprising three single-phase transformers or one three-phase, three-phase transformer.

Examples I and IV given hereinafter, mention the use of two current sources of the same nature (D. C.) and of two wires having the same diameters fed at the same speed. It will be noted that the voltages are not equal when the currents are equal and conversely. The current generators, therefore, are not adjusted in the same manner, even if they are identical.

Examples III and V refer to welding operations carried out on metal sheets of medium thickness and on thick sheets using a single pilot electrode, energized with D. C. and a single controlled electrode (Example III) or a double electrode (Example V). In each case, the feeding speeds of the two electrodes and the currents are identical but the voltage applied to the controlled electrode which is behind the pilot electrode is higher. This high voltage is desirable for avoiding an exceedingly convex bead.

These examples will show that in the welding of usual thicknesses, it is convenient and very satisfactory to feed all wires at the same speed and to use only two welding current sources. The pilot electrode, generally, comprises a single wire and is the leading one. It ensures part of the penetration desired. The controlled electrode is arranged back of the pilot electrode, at a distance generally between 1 and 10 centimeters, increasing with the thickness of the weldpiece. It finishes the penetration and determines the final shape of the bead. In this respect, it is recommended, when welding heavy gauge metal, to use a double controlled electrode arranged transversely to the seam. Welding is then effected with three electrode wires arranged in an isosceles triangle the apex of which is constituted by the pilot electrode placed above the seam. This arrangement, used in Example V, hereinafter, makes it possible to obtain a bead with a normal roundness in cases where the use of a single controlled electrode would result in an exaggeratedly convex bead. The spacing of the two wires constituting the controlled electrode is usually between 0.5 and 2.5 centimeters. It is often convenient to obtain these two wires from a coil manufactured according to the technique disclosed in the U. S. patent application Serial No. 482,592, filed by the same applicant January 18, 1955.

In some special cases, particularly when very high welding speeds are desired, three or even four current sources may be used, a single one of them, of course, being reserved for energizing the pilot electrode. The controlled electrodes are single or multiple according to the bevel preparation used and to the shapes desired for the bead.

For hard facing operations, there is an interest in utilizing the same arrangements as for welding, when narrow and deeply penetrated deposits are desired. On the contrary, for obtaining wide deposits, it is recommended to arrange the electrode wires along a line perpendicular to the direction of travel of the machine relatively to the workpiece.

For obtaining a wide deposit of slight penetration, the pilot and controlled electrodes should be power supplied with opposite polarities by two sources of the same nature and with the same phase if they are alternating. The spacing of these two electrodes makes it possible to adjust the penetration. It is observed that the latter is very slight when the spacing has the highest value consistent with the formation of a common molten pool.

Figure 1 is a theoretical diagram of two ganged arcs powered from two D. C. sources, with a feeding mechanism common to the two electrodes.

Figure 2 is a diagram similar to the above, but in which a D. C. source is used jointly with an alternating source.

Figure 3 shows an embodiment of the invention with two single phase transformers.

Figure 4 shows another embodiment, using two single phase transformers with leakage connected V-wise, on a three phase main.

Figure 5 is a diagram of two ganged arcs, particularly interesting for obtaining deposits of small penetration.

Figure 6 shows a particularly advantageous manner of arranging three electrodes in a triangle.

Figure 7 represents, side by side, a sectional view of a welding bead obtained with the leading electrode of Figure 6 and a section of the same bead broadened and deepened after the passage of the two follower electrodes.

There have been represented in Figure 1 two ganged electrodes 1 and 2 in welding position over a workpiece 3. The electrode 1 is connected to the positive terminal of a generator 4 and the electrode 2 with the positive terminal of a second generator 5. The negative terminals of these two machines are connected with the work 3. The welding head, represented diagrammatically, comprises a feed motor 6 which drives, together, two rollers 7 and 8 intended respectively for feeding the wire 1 and the wire 2. A reduction gear 9 makes it possible to adapt correctly the speed of rotation of the rollers 7 and 8 with that of the motor. A control box 10 of any conventional type ensures the automatic regulation of the speed of rotation of the motor 6 and consequently of the rollers 7 and 8 as a function of the fluctuations of arc voltage at the pilot electrode, i. e. electrode 2 in the drawing.

The generator which energizes the other electrode is optionally provided with a control box 11 for manual remote control by means of which the operator may, if need be, carry out suitable corrections in adjustment, for instance at the moment an operation is started.

Figure 2 shows a circuit quite similar to that of Figure 1, except that the second generator 5 is replaced by a transformer 12. The automatic adjustment box for the feed speed is not represented in this figure, nor in the next figures, 3, 4 and 5. It will be assumed to be connected, as in Figure 1, between the work to be welded 3 and one of the two electrodes which becomes the pilot electrode.

Figure 3 shows the use of two single phase conventional welding transformers, 13 and 14 connected, as shown in the drawing, with the same phase of the mains. These transformers may be identical in type or different.

Figure 4 shows, again by way of example, how the improvement according to the present invention can apply to the case of a three phase distribution. The electrodes are energized by two welding transformers 15 and 16, identical or different. One electrode 1 is energized by 15, a second electrode by 16, while the work 3 is connected with the common point of the secondaries of these two transformers.

A preferred embodiment of the invention for slightly penetrated deposits, such as hard-facing, is shown in Figure 5, and is characterized by the use of two D. C. sources 4 and 5 connected in such a manner that the electrodes 1 and 2 have opposite polarities. The electrode 1 is connected with the + terminal of the source 4 and the electrode 2 with the − terminal of the source 5 while the − terminal of the source 4 and the + terminal of the source 5 are connected together at 18, the junction 18 being itself connected with the work 3 by a balancing conductor 19. The function of this conductor 19 could be made visible by inserting therein an ammeter (not shown in the drawing) and by observing its fluctuations during welding.

Figure 6 shows a particularly convenient embodiment of the invention, in which three electrodes are arranged as an isosceles triangle. The electrode 1 is placed alone, in front, at the most acute apex of the triangle, and moves along the axis of the joint to be welded, while the two rear electrodes 2a and 2b connected together in parallel with one current source, not shown, are driven by the same roller provided with two grooves, spaced by about 8 or 9 mm., so that these electrodes 2a and 2b travel on both sides of the bead deposited by the first electrode. Figure 7 shows, diagrammatically, the effect of this arrangement, when operating on a plane metal sheet: the bead 21, deposited by the first electrode, is narrow and rounded, and in addition it is generally porous due to the high travel speed of the electrode. There are then shown, at 22, the modifications undergone by the bead after the passing of the rear electrodes 2a and 2b. The upper portion of this bead has been broadened and flattened, the penetration has been increased and the porosities have disappeared. The results obtained are especially favorable when the rear electrodes are approximately two thirds of the length of the molten pool away from the first electrode.

There will be found, hereinafter, a few numerical examples of the operating conditions which gave good results. In these examples the rates of all electrode wires are identical at all times.

*Example I.*—Two 3 mm. sheets, not chamfered, were welded end to end with a copper support. A total penetration was aimed at using two electrodes in tandem. The two electrodes had the same diameter, 2 mm., they were spaced 8 mm. apart and energized with D. C. The leading electrode was subjected to a current of 260 a., and the second one to 210 a., the voltage being substantially the same for the two electrodes, and close to 28 to 30 volts. The current density was about 83 a./mm.$^2$ for the first electrode and 67 for the second one. The welding speed was 2 meters per minute. The leading electrode was the pilot electrode.

*Example II.*—Same data as above, except that the thickness of the sheets is 6 mm., the diameter of the electrodes 3.2 mm. and their spacing 20 mm. The leading electrode is energized with D. C. under 28/30 volts, and 700 a. and the second one with A. C. under 30/32 volts and 600 a. The welding speed is 1.10 m./minute.

*Example III.*—This example concerns the edge to edge welding of non chamfered sheets, with one run on each face, the two runs showing interpenetration.

| Thickness, mm. | Run | Power Supply | Wire diam. | Speed, cm./min. | Electrode spacing, mm. | Density, a./mm.$^2$ |
|---|---|---|---|---|---|---|
| 10 | 1st | 1st wire, D. C., 500 amp., 30 v | 3.2 | 140 | 20 | 62.5 |
|    | 1st | 2nd wire, A. C., 500 amp., 36 v | 3.2 | 140 |    | 62.5 |
|    | 2nd | 1st wire, D. C., 650 amp., 30 v | 3.2 | 120 |    | 81 |
|    | 2nd | 2nd wire, A. C., 650 amp., 38 v | 3.2 | 120 |    | 81 |
| 20 | 1st | 1st wire, D. C., 800 amp., 34 v | 3.2 | 80 | 40 | 64 |
|    | 1st | 2nd wire, A. C., 800 amp., 42 v | 3.2 | 80 |    | 64 |
|    | 2nd | 1st wire, D. C., 1,100 amp., 35 v | 3.2 | 55 |    | 88 |
|    | 2nd | 2nd wire, A. C., 1,100 amp., 45 v | 3.2 | 55 |    | 88 |

*Example IV.*—Welding with two ganged arcs, in two runs, of two sheets, chamfered on one side only, that of the second pass, the sheet thickness being 25 mm., the chamfer angle 60° and its height 9 mm. The two 4 mm. electrodes, spaced 45 mm. apart are energized with D. C., both at 900 a. for the first run which is effected at a speed of 0.80 m./min. and 1100 a. for the second run which is effected at a speed of 0.60 m./min. The voltage is adjusted at 34 v. for the first electrode and 43/45 v. for the second one.

*Example V.*—Welding in two runs with a double rear electrode (controlled electrode) consisting of two 3.2 mm. wires, placed transversely, spaced 9 mm. apart. For a thickness of 36 mm., two chamfers are provided, one at 60° the other one at 90° the non chamfered thickness being 16 mm. The head electrode (pilot electrode) with a diameter of 4 mm., is energized with D. C., under 1100 a. and 34 volts for the first run and 1150 a. and 36 v. for the second run. The rear double electrode is energized with A. C. under 1500 a. and 44 v. for the first run and 1550 a. and 46 v. for the second one.

The above examples bring out the advantages brought by the improvement according to the present invention, as regards the rapidity of execution of welding, the speed of which is more than doubled in most cases. It will also be noted that the bevel, on very thick sheets is less deep, and at a more acute angle, which results in a saving in the preparation of the sheets, with a large saving in electrode wire and flux.

Finally, it will be seen from these examples, that it is preferred, in general, to take the leading electrode as a pilot electrode, and to energize the latter at a lower voltage than the rear electrode. The above examples also show, by their diversity, that the invention can be successfully put in practice under the most varied conditions, provided the general characteristics stated at the beginning are met.

What I claim is:

1. In an automatic multiple-arc welding process using fusible electrodes, the improvement which comprises, maintaining a constant ratio between the feed rates of the electrodes, automatically controlling said rates together in function of the variations of the arc voltage of a single one of said electrodes, energizing said single electrode from an independant welding current source, and energizing the other electrodes from at least one current source of a known type having self-adjusting output features, whereby the melting rates of said other electrodes are kept proportional to the feed rate of the said single electrode.

2. A welding method according to claim 1, in which two electrodes are connected to two direct current sources so as to show opposite polarities, and the workpiece is connected to the common terminal of said sources.

3. In a multi-arc automatic welding process in which several fusible electrodes separately energized by a plurality of welding current sources are fed simultaneously to a common weld pool through a layer of granular flux, one of said electrodes being in a leading travel position respectively to the other electrodes, a method for simultaneously feeding all said electrodes by means of a single motor, which comprises automatically controlling the speed of said motor in function of the arc voltage of said leading electrode, and energizing said other electrodes by welding current sources having self-adjusting output features.

References Cited in the file of this patent

UNITED STATES PATENTS

| 2,527,336 | Schaefer | Oct. 24, 1950 |
| 2,669,640 | Outcalt et al. | Feb. 16, 1954 |

FOREIGN PATENTS

| 644,758 | France | June 18, 1928 |
| 896,931 | France | May 8, 1944 |